Aug. 6, 1963 M. E. CLYNES 3,100,285
LINEAR PULSE FREQUENCY MODULATOR
Filed Nov. 28, 1960
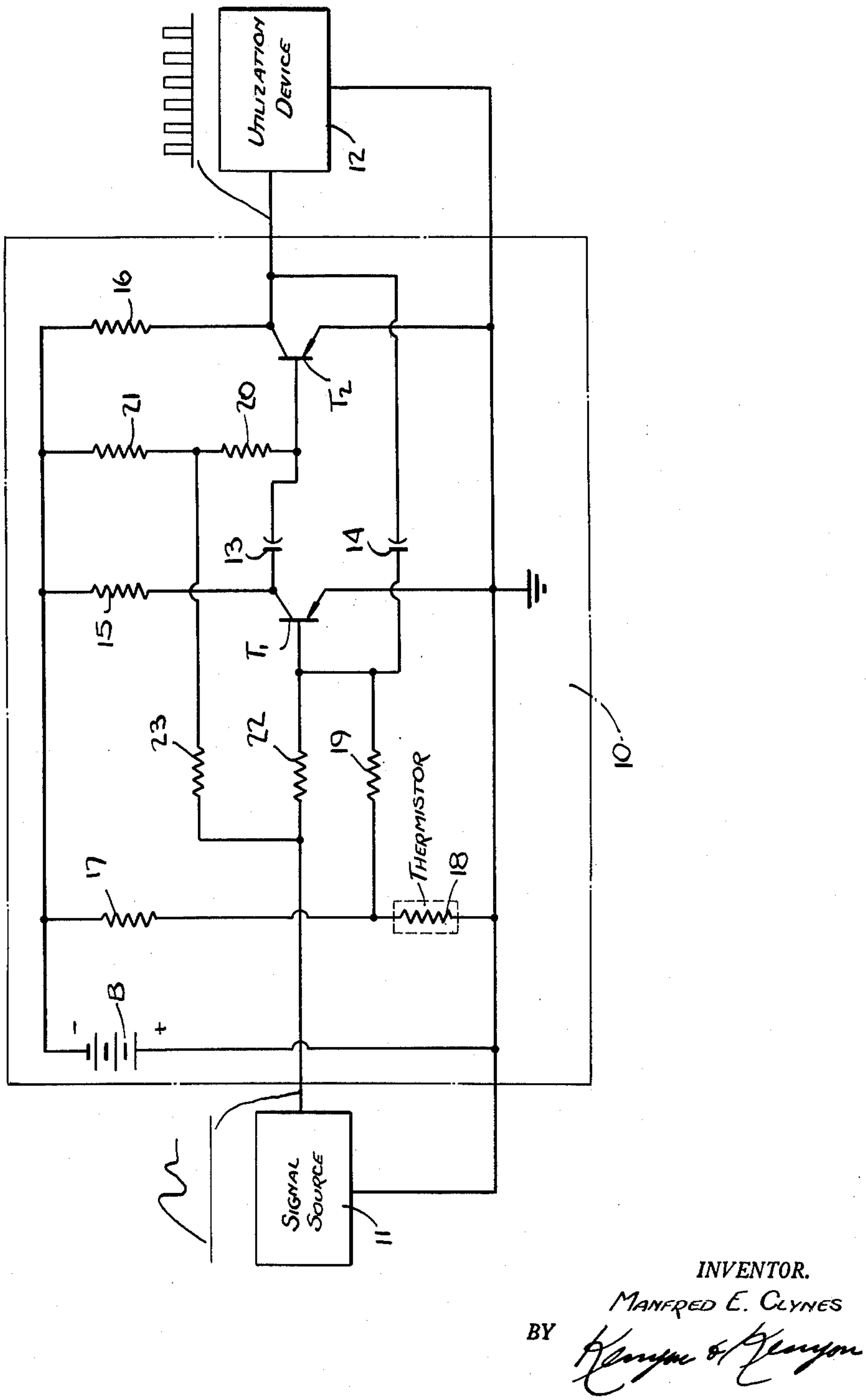
INVENTOR.
MANFRED E. CLYNES
BY Kenyon & Kenyon
ATTORNEYS 3,100,285
Patented Aug. 6, 1963

3,100,285

LINEAR PULSE FREQUENCY MODULATOR

Manfred E. Clynes, Orangeburg, N.Y., assignor to Mnemotron Corporation, a corporation of New York Filed Nov. 28, 1960, Ser. No. 72,171
3 Claims. (Cl. 332—14)

The present invention relates generally to pulse frequency modulator circuit and more particularly to pulse modulators adapted to generate a pulse train whose repetition rate varies linearly in accordance with the amplitude of a modulating signal.

Trigger-action transistor circuits may be arranged to function in any one of three principal modes; namely, monostable operation as in the case of a one shot multivibrator, bistable operation as typified by a flip-flop circuit and astable operation as with free-running or self-running multivibrators.

It is known that the operating frequency or repetition rate of a free-running multivibrator may be varied as a function of the amplitude of an applied signal. However, with free-running multivibrators of standard design, the relationship between signal amplitude and pulse frequency cannot be maintained in a linear manner throughout a broad range. For example, with conventional astable circuits it has been found that for a modulating signal causing a frequency shift through two octaves, the departure from linearity is as high as 20%. In order to compensate for such departures, it has heretofore been necessary to make use of relatively complex circuits either in the modulator or in the demodulator.

The lack of linearity in pulse modulators constitutes a serious drawback in such systems as are disclosed in my copending application, Serial No. 829,694, filed July 27, 1959, wherein an analog voltage is recorded in terms of a train of pulses whose repetition rate is varied accordingly, and wherein the pulses so recorded are subsequently reproduced and demodulated to derive the original signal. Deviations in the linearity of the pulse modulator give rise to distortion in the reproduced signal and the use of additional circuits to correct for such deviations adds materially to the cost of the system.

Accordingly, it is the principal object of this invention to provide a pulse frequency modulator having improved linear modulation characteristics.

More specifically, it is an object of the invention to provide a transistorized pulse modulator which is inherently linear to within a fraction of 1% over a fre-frequency range exceeding two octaves of modulation. In a practical embodiment of the invention, the linearity attained is as great as 0.1% over a range of 4,000 to 11,000 pulses per second. A significant feature of the invention lies in the fact that the pulse modulator attains a high order of linearity without the use of external compensating circuits.

It is a further object of the invention to provide a linear pulse-frequency transistorized modulator which is stabilized with respect to variation of temperature.

Yet another object of the invention is to provide a pulse modulator of the above-noted type which is simple in design, which is accurate and reliable in operation and which may be manufactured at low cost.

Briefly stated, these objects are attained in an astable multivibrator having a predetermined asymmetry and constituted by a pair of transistors having grounded emitters, the collectors and bases of the two transistors being cross-coupled, the modulating signal being applied to the base of the first transistor and to the base biasing circuit of the second transistor to effect a linear variation in the repetition rate of the generated pulses in accordance with the amplitude of the signal.

For a better understanding of the invention as well as other objects and features thereof, reference is made to the accompanying drawing which illustrates schematically a preferred embodiment of a linear pulse frequency modulator in accordance with the invention.

Referring now to the drawing, there is shown a pulse frequency modulator, generally designated by numeral 10, a modulating signal source 11 and an output utilization device 12. The linear pulse frequency modulator in accordance with the invention is particularly suited for operation with slowly varying direct-current signals although it is by no means limited to this range and will operate effectively with carrier frequencies in the megacycle range.

The linear pulse frequency modulator 10 is constituted by a pair of transistors $T_1$ and $T_2$ which are cross-coupled to form an astable asymmetrical multivibrator generating carrier pulses which in practice may be in the audio or megacycle range. The application of a modulation voltage to the multivibrator causes the frequency or repetition of the pulses generated thereby to vary about the carrier frequency in accordance with the amplitude of the signal.

The frequency modulated output pulses of the modulator are applied to a utilization device which may take the form of a pulse shaper or regenerator to provide standardized pulses of constant amplitude and duration but having the same repetition rate as the applied pulses. A more detailed description of such utilization device is disclosed in the above-identified copending application. The pulse modulator is also useful in any communication or data processing system employing pulse time or frequency modulation.

In the multivibrator circuit, the collector of transistor $T_1$ is coupled through condensers 13 to the base of transistor $T_2$ and the collector of transistor $T_2$ is connected through condenser 14 to the base of transistor $T_1$, the emitters of both transistors being grounded. The operating frequency of the multivibrator is determined primarily by these capacitors. A voltage source in the form of battery B is provided, the positive terminal thereof being grounded, the negative terminal being connected through resistors 15 and 16 to the collectors of transistors $T_1$ and $T_2$, respectively. Thus the emitter of each transistor is positively biased relative to the collector thereof.

Shunted across battery B is a voltage divider formed by resistor 17 in series with a thermistor 18, the junction thereof being connected through resistor 19 to the base of transistor $T_1$. The base of transistor $T_2$ is connected through serially-connected resistors 20 and 21 to the negative terminal of battery B.

The signal source 11 is connected with respect to ground through resistor 22 to the base of transistor $T_1$ and also to the junction of resistors 20 and 21 through resistor 23. Output pulses from the modulator are taken from the collector of transistor $T_2$.

To ensure an initial degree of linearity of 2 to 3% between the amplitude of the modulating signal and the repetition rate of the generated pulse for frequency changes of two octaves, there must be a proper degree and kind of asymmetry in the action of the multivibrator.

The speed of recovery depends inversely upon the size of the condenser to be charged and directly upon the amount of current which is made to flow through it. In the case of a bistable circuit, condensers will ordinarily not exceed 500 mmf. in value, with a corresponding small recovery time.

It has been found that to achieve the proper asymmetry characteristics, the value of the feedback capacitor 14 between the collector of transistor $T_2$ and the base of transistor $T_1$ should be at least five times greater than the coupling capacitor 13 between the collector of transistor $T_1$ and the base of transistor $T_2$. In addition to the unequal capacitors, unequal bias and load resistors effect the desired asymmetry. The resultant asymmetry in the multivibrator action effects an initial degree of modulation linearity in the order of 2 to 3%.

A further improvement in the linearity is obtained by feeding the modulation signal not only directly to the base of transistor $T_1$ but also to the biasing circuit in the base of transistor $T_2$. This simultaneous application of the modulation signal to the base circuits of both transistors is effected through resistor 22 for transistor $T_1$ and resistor 23 for transistor $T_2$. Linearity is further improved if the series-connected biasing resistors 20 and 21 for the base of transistor $T_2$ are substantially equal in value, the modulating signal from resistor 23 being applied to the junction thereof.

It has been found that with an asymmetrical multivibrator, as above described, wherein the modulation signal is concurrently fed to the bases of both transistors, the linearity is optimized to within 0.1%. Pulse modulator 10 acts to generate a train of pulses having about a 15% duty cycle, the repetition rate varying linearly about a center or carrier value in accordance with amplitude variations in the modulating signal.

Transistors are solid state devices and are characteristically temperature sensitive. This factor, unless corrected, gives rise to fluctuations in the operating frequency of the free-running multivibrator. Thus with elevation in the ambient temperature to which transistor $T_1$ is subjected, there is an increase in the sensitivity of the transistor and conduction will occur for a smaller input signal at the base thereof. This effect is corrected by thermistor 18 which is temperature sensitive and which decreases in resistance in response to a rise in ambient temperature. The decrease in resistance of the thermistor in the voltage divider which includes resistor 17 serves to decrease the bias on the base of $T_1$ and a greater signal amplitude is required to cause conduction of transistor $T_1$, thereby compensating for the change in sensitivity.

An important advantage of the linear pulse frequency modulator in accordance with the invention is in connection with recording and reproducing pulses on magnetic tape in the manner disclosed in the copending application, identified hereinabove. When a magnetic recorder of ordinary quality is used, the recording and play-back speeds are subject to flutter and other variations in speed which are reflected in changes in the pulse repetition rate. Since however the modulation in pulse frequency is broad band and it is possible to effect a wide and linear sweep in frequency of the modulator, minor variations in pulse frequency resulting from tape speed fluctuation are almost negligible relative to the modulation band width and distortion is thereby minimized.

The following are representative values of the components in the pulse modulator:

| | | |
|---|---|---|
| Resistor **15** | ohms | 10,000 |
| Resistor **19** | do | 100,000 |
| Resistor **17** | do | 5,600 |
| Resistor **16** | do | 2,200 |
| Resistor **20** | do | 27,000 |
| Resistor **21** | do | 27,000 |
| Resistor **23** | do | 270,000 |
| Resistor **22** | do | 100,000 |
| Capacitor **13** | mmf | 500 |
| Capacitor **14** | mmf | 22,000 |
| Transistor $T_1$ | | CK-722 |
| Transistor $T_2$ | | CK-722 |
| Thermistor **18** | | GE R-113 |

While there have been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A linear pulse frequency modulator comprising a free-running astable multivibrator provided with a pair of transistors having base electrodes and circuits therefor, first and second capacitors cross-coupling said transistors and having relative reactive values causing said multivibrator to operate asymmetrically to produce a train of pulses, and means to apply a modulating signal simultaneously to the base circuits of both transistors to vary the repetition rate of said pulses as a linear function of the amplitude of said signal.

2. A temperature compensated pulse frequency modulator for generating pulses whose repetition rate is a linear function of the amplitude of an applied modulating signal comprising an astable multivibrator having first and second transistors, each provided with a collector, an emitter and a base, a first capacitor intercoupling the collector and base of the first and second transistors respectively, a second capacitor intercoupling the collector and base of said second and first transistors respectively, voltage means to apply a constant positive potential to the emitters of said transistors relative to the collectors thereof, thermistor means coupled to said voltage means to apply a bias to the base of said first transistor which varies as a function of temperature to compensate for temperature effects, a resistance network coupled to said voltage means to apply a bias to the base of the second transistor, and means to apply said modulating signal simultaneously to the base of said first transistor and to a point in said resistance network.

3. A pulse frequency modulator for generating pulses whose repetition rate is a linear function of the amplitude of an applied modulating signal comprising an astable highly asymmetrical multivibrator having first and second transistors, each provided with a collector, an emitter and a base, a first capacitor intercoupling the collector and base of the first and second transistors respectively, a second capacitor intercoupling the collector and base of said second and first transistors respectively, said second capacitor having a value at least five times greater than the first capacitor, voltage means to apply a constant positive potential to the emitters of said transistors relative to the collectors thereof, resistance networks coupled to said voltage means to apply a bias to the bases of said first and said second transistors respectively, and means to apply said modulating signal simultaneously to the base of said first transistor and to a point in said resistance networks biasing the base of said second transistor.

References Cited in the file of this patent

UNITED STATES PATENTS

| | | |
|---|---|---|
| 2,605,306 | Eberhard | July 29, 1952 |
| 2,826,741 | Cook | Mar. 11, 1958 |
| 2,841,712 | Hoge et al. | July 1, 1958 |
| 2,850,630 | Prugh | Sept. 2, 1958 |
| 2,976,496 | Hakimoglu | Mar. 21, 1961 |
| 2,984,729 | Hykes et al. | May 16, 1961 |
| 2,997,665 | Sylvan | Aug. 22, 1961 |
| 3,013,220 | Norris | Dec. 12, 1961 |